(12) United States Patent
Tanigawa et al.

(10) Patent No.: US 11,746,663 B2
(45) Date of Patent: Sep. 5, 2023

(54) HIGH-TEMPERATURE COMPONENT AND METHOD OF PRODUCING THE HIGH-TEMPERATURE COMPONENT

(71) Applicant: Mitsubishi Power, Ltd., Kanagawa (JP)

(72) Inventors: Shuji Tanigawa, Tokyo (JP); Koichiro Iida, Tokyo (JP); Ryuta Ito, Tokyo (JP); Taro Tokutake, Tokyo (JP); Yoshinori Wakita, Tokyo (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 73 days.

(21) Appl. No.: 17/431,610

(22) PCT Filed: Feb. 19, 2020

(86) PCT No.: PCT/JP2020/006559
§ 371 (c)(1),
(2) Date: Aug. 17, 2021

(87) PCT Pub. No.: WO2020/202867
PCT Pub. Date: Oct. 8, 2020

(65) Prior Publication Data
US 2022/0074313 A1    Mar. 10, 2022

(30) Foreign Application Priority Data
Mar. 29, 2019 (JP) ................ 2019-065817

(51) Int. Cl.
*F01D 9/04* (2006.01)
*F01D 25/12* (2006.01)
(Continued)

(52) U.S. Cl.
CPC .............. *F01D 9/04* (2013.01); *F01D 25/12* (2013.01); *F01D 25/24* (2013.01); *B33Y 80/00* (2014.12);
(Continued)

(58) Field of Classification Search
CPC . F01D 25/24; F01D 25/12; F01D 9/04; F01D 5/187; F02K 9/40; F02K 9/46;
(Continued)

(56) References Cited

U.S. PATENT DOCUMENTS 10,316,750 B2 * 6/2019 Loebig ...................... F02C 3/04
10,371,053 B2 * 8/2019 Loebig ...................... F02C 7/18
(Continued)

FOREIGN PATENT DOCUMENTS

JP    2005-90512    4/2005
JP    2015-17608    1/2015
(Continued)

OTHER PUBLICATIONS

International Search Report dated Apr. 21, 2020 in corresponding International Application No. PCT/JP2020/006559, with English translation.
(Continued)

*Primary Examiner* — Igor Kershteyn
(74) *Attorney, Agent, or Firm* — Wenderoth, Lind & Ponack, L.L.P.

(57) ABSTRACT

A high-temperature component according to an embodiment is a high-temperature component which requires cooling by a cooling medium, and includes: a plurality of cooling passages through which the cooling medium is able to flow; a header portion to which downstream ends of the plurality of first cooling passages are connected; and at least one outlet passage for discharging the cooling medium flowing into the header portion to outside of the header portion. A roughness of an inner wall surface of the at least one outlet passage is not greater than a roughness of an inner wall surface of the plurality of first cooling passages in a region where a flow-passage cross-sectional area of the outlet passage is the smallest.

15 Claims, 7 Drawing Sheets

(51) Int. Cl.
*F01D 25/24* (2006.01)
*B33Y 80/00* (2015.01)

(52) U.S. Cl.
CPC ............... *F05D 2260/2214* (2013.01); *F05D 2260/232* (2013.01); *F05D 2300/516* (2013.01)

(58) Field of Classification Search
CPC .. B22F 5/10; B22F 10/20; B22F 10/34; B22F 10/38; B22Y 10/00; B22Y 80/00; F05D 2240/11; F05D 2260/232; F05D 2260/2214; F05D 2300/516; Y02P 10/25
See application file for complete search history.

(56) References Cited

U.S. PATENT DOCUMENTS

| | | | | |
|---|---|---|---|---|
| 10,422,229 | B2* | 9/2019 | Clum | F01D 5/18 |
| 10,677,079 | B2* | 6/2020 | Propheter-Hinckley | F02C 3/04 |
| 11,021,967 | B2* | 6/2021 | Gallier | F01D 9/04 |
| 2005/0058534 | A1 | 3/2005 | Lee et al. | |
| 2005/0173388 | A1 | 8/2005 | Lavers et al. | |
| 2006/0093480 | A1 | 5/2006 | Cunha et al. | |
| 2007/0041827 | A1* | 2/2007 | Camus | F01D 25/12 415/116 |
| 2012/0057968 | A1* | 3/2012 | Lee | F01D 11/08 415/178 |
| 2013/0323033 | A1* | 12/2013 | Lutjen | F01D 1/02 415/173.1 |
| 2015/0013345 | A1 | 1/2015 | Porter et al. | |
| 2015/0059357 | A1 | 3/2015 | Morgan et al. | |
| 2015/0152737 | A1* | 6/2015 | Liang | F01D 5/187 416/96 R |
| 2016/0319678 | A1 | 11/2016 | Staroselsky et al. | |
| 2017/0138599 | A1 | 5/2017 | Baibuzenko et al. | |
| 2018/0320595 | A1 | 11/2018 | Sato et al. | |
| 2022/0074313 | A1* | 3/2022 | Tanigawa | F01D 25/24 |

FOREIGN PATENT DOCUMENTS

| | | |
|---|---|---|
| JP | 2015-48848 | 3/2015 |
| JP | 2015-105656 | 6/2015 |
| JP | 2017-20422 | 1/2017 |
| JP | 2017-96616 | 6/2017 |
| WO | 2017/077955 | 5/2017 |

OTHER PUBLICATIONS

Translation of the International Preliminary Report on Patentability dated Oct. 14, 2021 in International Application No. PCT/JP2020/006559.

* cited by examiner

A4-A4 ARROW CROSS-SECTIONAL VIEW

HIGH-TEMPERATURE COMPONENT AND METHOD OF PRODUCING THE HIGH-TEMPERATURE COMPONENT

TECHNICAL FIELD

The present disclosure relates to a high-temperature component and a method of producing the high-temperature component.

BACKGROUND ART

For instance, in a machine inside which a high-temperature working gas flows, such as a gas turbine and a rocket turbine, components constituting the machine include high-temperature components that require cooling by a cooling medium. As a cooling structure of such a high-temperature component, it is known to cool a high-temperature component by letting cooling air flow through a plurality of feed channels (cooling passages) through which cooling air is able to flow inside the component (see Patent Document 1 for instance).

Furthermore, in recent years, additive fabrication, which obtains a three-dimensional shaped object by laminating metal, is used to produce various metal products. For instance, in additive fabrication that uses the powder bed method, a metal powder laid in a layer is radiated with an energy beam such as an optical beam and an electronic beam, and layers are laminated while repeating melting and solidifying, thereby forming a three-dimensional shaped object.

In the region irradiated with an energy beam, the metal powder is rapidly melted, and then cooled and solidified rapidly, whereby a metal solidified layer is formed. As the above process is repeated, an additive fabrication object having a three-dimensional shape is formed.

Furthermore, recently, as a method of producing a high-temperature component having a complex shape like a turbine blade, additive fabrication is beginning to be applied, which enables direct shaping without involving complicated producing steps.

CITATION LIST

Patent Literature

Patent Document 1: JP2015-48848A
Patent Document 2: JP2017-20422A

SUMMARY

Problems to be Solved

When, as in the metal additive fabrication described in Patent Document 2, a metal material powder is melted and solidified in laminated layers to form an additive fabrication object, the surface roughness generally becomes relatively rough. Specifically, for instance, the surface roughness is 10 μm or more in the center-line mean roughness Ra. Furthermore, at an overhang portion which has a space portion in a region vertically below when laminated, the surface roughness tends to become rougher, for instance, 30 μm or more in the center-line mean roughness Ra.

For a high-temperature component that requires cooling by a cooling medium like the turbine component described in Patent Document 1, the roughness of the inner wall surface of the cooling passage formed inside should be rough in order to improve the cooling capacity. However, when the surface roughness of the inner wall surface of the cooling passage is rough, the pressure loss of the cooling medium increases. In particular, in a case where the cooling passage has an elaborate and complicated shape like that of a turbine component, the surface roughness of the inner wall surface has a significant influence on the pressure loss. In an extreme case, the flow rate of the cooling medium may decrease considerably.

In view of the above, an object of at least one embodiment of the present invention is to provide a high-temperature component that can prevent shortage of cooling capacity.

Solution to the Problems (1) According to at least one embodiment of the present invention, a high-temperature component which requires cooling by a cooling medium includes: a plurality of cooling passages through which the cooling medium is able to flow; a header portion to which downstream ends of the plurality of first cooling passages are connected; and at least one outlet passage for discharging the cooling medium flowing into the header portion to outside of the header portion. A roughness of an inner wall surface of the at least one outlet passage is not greater than a roughness of an inner wall surface of the plurality of first cooling passages in a region where a flow-passage cross-sectional area of the outlet passage is the smallest.

With the above configuration (1), the roughness of the inner wall surface of the plurality of first cooling passages is not smaller than the roughness of the inner wall surface of the outlet passage in the region where the flow-passage cross-sectional area of the outlet passage is the smallest, and thus it is possible to improve the cooling capacity of the first cooling passages. Furthermore, with the above configuration (1), the roughness of the inner wall surface of the outlet passage in the region where the flow-passage cross-sectional area of the outlet passage is the smallest is not greater than the inner wall surface of the plurality of cooling passages, and thus it is possible to suppress variation in the pressure loss at the outlet passage, and let foreign substances pass through the outlet passage more easily, thereby reducing the risk of clogging of the outlet passage.

(2) In some embodiments, in the above configuration (1), the inner wall surface of the at least one outlet passage has a center-line mean roughness Ra of not greater than 10 μm, in a region where the flow-passage cross-sectional area of the outlet passage is the smallest, and the inner wall surface of the plurality of first cooling passages has a center-line mean roughness Ra of not smaller than 10 μm and not greater than 20 μm.

With the above configuration (2), the inner wall surface of the plurality of first cooling passages has the above roughness, and thus it is possible to improve the cooling capacity of the first cooling passages. Furthermore, with the above configuration (2), the roughness of the inner wall surface of the outlet passage in the region where the flow-passage cross-sectional area of the outlet passage has the above roughness, and thus it is possible to suppress variation in the pressure loss at the outlet passage, and let foreign substances pass through the outlet passage more easily, thereby reducing the risk of clogging of the outlet passage.

(3) In some embodiments, in the above configuration (2), the high-temperature component further includes a plurality of second cooling passages which extend in a direction which intersects with an extension direction of the plurality of first cooling passages. An inner wall surface of the plurality of second cooling passages has a center-line mean roughness Ra of not smaller than 10 μm and not greater than 50 μm.

With the above configuration (3), the inner wall surface of the plurality of second cooling passages has the above roughness, and thus it is possible to improve the cooling capacity of the second cooling passages.

(4) In some embodiments, in any one of the above configurations (1) to (3), the at least one outlet passage includes a flow-passage cross-sectional area reduction portion where the flow-passage cross-sectional area of the outlet passage gradually decreases toward a downstream side.

With the above configuration (4), by adjusting the size in a direction orthogonal to the extension direction of the outlet passage from the downstream side of the flow-passage cross-sectional area portion, it is possible to adjust the minimum flow-passage cross-sectional area at the outlet passage more easily. Thus, in a case where the high-temperature component is configured such that the flow rate of the cooling medium in the high-temperature component is to be adjusted according to the size of the minimum flow-passage cross-sectional area of the outlet passage, it is possible to manage the flow rate of the cooling medium by managing the dimension in a direction orthogonal to the extension direction of the outlet passage at the downstream side of the outlet passage. Accordingly, it is possible to narrow the region where the accuracy of the flow-passage cross-sectional area, that is, the dimension accuracy of the passage, needs to be ensured, and suppress the production cost of the high-temperature component.

(5) In some embodiments, in any one of the above configurations (1) to (4), a roughness in at least a partial region of an inner wall surface of the header portion is not greater than the roughness of the inner wall surface of the plurality of first cooling passages.

The downstream ends of the plurality of cooling passages are connected to the header portion. Thus, at the header portion, the space volume increases, and the flow velocity of the cooling medium at the header portion decreases, which leads to a decrease in the coefficient of heat transfer to the cooling medium. Thus, design of the high-temperature component takes into account the decrease in the cooling capacity at the header portion compared to the cooling passage, that is, the relatively small contribution to cooling of the high-temperature component.

With the above configuration (5), the roughness in at least a partial region of the inner wall surface of the header portion is not greater than the roughness of the inner wall surface of the plurality of first cooling passages, and thus it is possible to suppress pressure loss at the header portion. As described above, contribution to cooling of the high-temperature component is relatively small at the header portion, and thus the influence of the decreased roughness of the header portion on cooling of the high-temperature component is small. Thus, it is possible to suppress impact on cooling of the high-temperature component and suppress pressure loss of the cooling medium.

(6) In some embodiments, in any one of the above configurations (1) to (5), the high-temperature component is a ring segment of a gas turbine including a plurality of segment bodies in a ring shape arranged along a circumferential direction.

With the above configuration (6), the ring segment of the gas turbine has one of the above configurations (1) to (5), and the roughness of the inner wall surface of the plurality of first cooling passages is not smaller than the roughness of the inner wall surface of the outlet passage in the region where the flow-passage cross-sectional area of the outlet passage is the smallest, and thus it is possible to improve the cooling capacity of the first cooling passages in the ring segment. Furthermore, with the above configuration (6), the roughness of the inner wall surface of the outlet passage in the region of the outlet passage where the flow-passage cross-sectional area of the outlet passage is the smallest is not greater than the roughness of the inner wall surface of the plurality of first cooling passages, and thus it is possible to suppress variation in the pressure loss at the outlet passage in the ring segment, and let foreign substances pass through the outlet passage more easily, thereby reducing the risk of clogging of the outlet passage.

(7) According to at least one embodiment of the present invention, a method of producing a high-temperature component which requires cooling by a cooling medium includes: a step of forming a plurality of cooling passages through which the cooling medium is able to flow; a step of forming a header portion to which downstream ends of the plurality of first cooling passages are connected; and a step of forming at least one outlet passage for discharging the cooling medium flowing into the header portion to outside of the header portion. The step of forming the at least one outlet passage includes forming the at least one outlet passage such that a roughness of an inner wall surface of the at least one outlet passage is not greater than a roughness of an inner wall surface of the plurality of first cooling passages in a region where a flow-passage cross-sectional area of the outlet passage is the smallest.

According to the above method (7), the roughness of the inner wall surface of the plurality of first cooling passages is not smaller than the roughness of the inner wall surface of the outlet passage in the region of where the flow-passage cross-sectional area of the outlet passage is the smallest, and thus it is possible to improve the cooling capacity of the first cooling passages. Furthermore, according to the above method (7), the roughness of the inner wall surface of the outlet passage in the region where the flow-passage cross-sectional area of the outlet passage is the smallest is not greater than the roughness of the inner wall surface of the plurality of cooling passages, and thus it is possible to suppress variation in the pressure loss at the outlet passage, and let foreign substances pass through the outlet passage more easily, thereby reducing the risk of clogging of the outlet passage.

(8) In some embodiments, in the above method (7), the step of forming the at least one outlet passage includes forming the at least one outlet passage so as to include a flow-passage cross-sectional area reduction portion where the flow-passage cross-sectional area of the outlet passage gradually decreases toward a downstream side.

According to the above method (8), by adjusting the size in a direction orthogonal to the extension direction of the outlet passage from the downstream side of the flow-passage cross-sectional area portion, it is possible to adjust the minimum flow-passage cross-sectional area of the outlet passage more easily. Thus, in a case where the high-temperature component is configured such that the flow rate of the cooling medium in the high-temperature component is to be adjusted according to the size of the minimum flow-passage cross-sectional area of the outlet passage, it is possible to manage the flow rate of the cooling medium by managing the dimension in a direction orthogonal to the extension direction of the outlet passage at the downstream side of the outlet passage. Accordingly, it is possible to narrow the region where the accuracy of the flow-passage cross-sectional area, that is, the dimension accuracy of the passage, needs to be ensured, and suppress the production cost of the high-temperature component.

(9) In some embodiments, in the above method (7) or (8), the step of forming the at least one outlet passage includes forming the at least one outlet passage so that a roughness of an inner wall surface of the at least one outlet passage is not greater than a roughness of an inner wall surface of the plurality of first cooling passages in a region where the flow-passage cross-sectional area of the outlet passage is the smallest, by etching at least a partial section of the outlet passage which includes the region.

According to the above method (9), it is possible to easily reduce the roughness of the outlet passage in at least a partial section including a region where the flow-passage cross-sectional area of the outlet passage is the smallest. Furthermore, according to the above method (9), even in a region where it is difficult to apply machine processing from the downstream end of the outlet passage, it is possible to easily reduce the roughness.

(10) In some embodiments, in the above method (9), the method further includes a step of etching at least a partial region of an inner wall surface of the header portion so that a roughness of the inner wall surface of the header portion is not greater than the roughness of the inner wall surface of the plurality of first cooling passages in the region.

According to the above method (10), the roughness in at least a partial region of the inner wall surface of the header portion is not greater than the roughness of the inner wall surface of the plurality of first cooling passages, and thus it is possible to suppress pressure loss at the header portion. As described above, contribution to cooling of the high-temperature component is relatively small at the header portion, and thus the influence of the decreased roughness of the header portion on cooling of the high-temperature component is small. Thus, it is possible to suppress impact on cooling of the high-temperature component and suppress pressure loss of the cooling medium.

(11) In some embodiments, in any one of the above methods (7) to (10), the step of forming the at least one outlet passage includes forming the at least one outlet passage by metal additive fabrication or precision casting, and the method further includes a step of applying machine processing to at least a part of the inner wall surface of the at least one outlet passage.

According to the above method (11), it is possible to suppress the production cost of the high-temperature component compared to a case in which the outlet passage is formed merely by machine processing. Furthermore, according to the above method (11), compared to a case in which the outlet passage is formed by metal additive fabrication or precision casting alone, it is possible to improve the dimension accuracy of the inner wall surface of the outlet passage, and improve the accuracy in regulation of the flow rate of the cooling medium. Furthermore, according to the above method (11), it is possible to adjust the dimension of the inner wall surface of the outlet passage while checking the flow rate of the cooling medium, and thus it is possible to suppress excess and shortage of the flow rate of the cooling medium.

(12) In some embodiments, in any one of the above methods (7) to (11), the step of forming the plurality of first cooling passages includes forming, by metal additive fabrication, the plurality of first cooling passages by laminating a material powder in a first laminate thickness. The step of forming the header portion includes forming, by metal additive fabrication, the header portion by laminating the material powder in a second laminate thickness which is not greater than the first laminate thickness. The step of forming the outlet passage includes forming, by metal additive fabrication, the outlet passage by laminating the material powder in a third laminate thickness smaller than the first laminate thickness.

Generally, when the laminate thickness is increased in metal additive fabrication, the surface roughness of a fabrication object is likely to increase. In other words, when the laminate thickness is decreased in metal additive fabrication, the surface roughness of a fabrication object is likely to decrease.

Thus, as in the above method (12), with the second laminate thickness for forming the header portion being not greater than the first laminate thickness for forming the first cooling passage, it is possible to, for the header portion, suppress the roughness and suppress pressure loss of the cooling medium, and, for the first cooling passages, increase the roughness relatively and improve the cooling capacity.

Furthermore, as in the above method (12), with the third laminate thickness for forming the outlet passage being smaller than the first laminate thickness for forming the first cooling passage, it is possible to, for the outlet passage, suppress the roughness and suppress variation in pressure loss at the outlet passage, and let foreign substances pass through the outlet passage more easily, thereby reducing the risk of clogging of the outlet passage. Furthermore, for the first cooling passages, as described above, it is possible to increase the roughness relatively and improve the cooling capacity.

(13) In some embodiments, in any one of the above methods (7) to (12), the step of forming the plurality of first cooling passages includes forming, by metal additive fabrication, the plurality of first cooling passages by using a material powder having a first particle size. The step of forming the header portion includes forming, by metal additive fabrication, the header portion by using a material powder having a second particle size not greater than the first particle size. The step of forming the outlet passage includes forming, by metal additive fabrication, the outlet passage by using a material powder having a third particle size smaller than the first particle size.

Generally, when the particle size of the material powder is increased in metal additive fabrication, the surface roughness of a fabrication object is likely to increase. In other words, when the particle size of the material powder is decreased in metal additive fabrication, the surface roughness of a fabrication object is likely to decrease.

Thus, as in the above method (13), with the second particle size of the material powder for forming the header portion (second particle size) being not greater than the particle size of the material powder for forming the first cooling passage (first particle size), it is possible to, for the header portion, suppress the roughness and suppress pressure loss of the cooling medium, and, for the first cooling passages, increase the roughness relatively and improve the cooling capacity.

Furthermore, as in the above method (13), with the particle size of the material powder for forming the outlet passage (third particle size) being smaller than the particle size of the material powder for forming the first cooling passage (first particle size), it is possible to, for the outlet passage, suppress the roughness and suppress variation in pressure loss at the outlet passage, and let foreign substances pass through the outlet passage more easily, thereby reducing the risk of clogging of the outlet passage. Furthermore, for the first cooling passages, as described above, it is possible to increase the roughness relatively and improve the cooling capacity.

(14) In some embodiments, in any one of the above methods (7) to (13), the method further includes a step of forming, by metal additive fabrication, a plurality of second cooling passages extending in a direction which intersects with an extension direction of the plurality of first cooling passages by laminating the material powder in the extension direction of the first cooling passages. An overhang region, of an inner wall surface of the plurality of second cooling passages, where an overhang angular degree is a predetermined angular degree or more upon lamination of the material powder, has a center-line mean roughness Ra of not smaller than 30 μm and not greater than 50 μm. A region, other than the overhang region, of the inner wall surface of the plurality of second cooling passages has a center-line mean roughness Ra of not smaller than 10 μm and not greater than 30 μm.

Generally, in metal additive fabrication, the roughness in an overhang region where the overhang angle is a predetermined angular degree, for instance 45 angular degrees, or more, upon lamination of a material powder, tends to be greater compared to the region other than the overhang region. According to the above method (14), by utilizing the above tendency in metal additive fabrication, it is possible to have an increased roughness in a partial region of the inner wall surface of the second cooling passages, and improve the cooling capacity in the second cooling passage.

(15) In some embodiments, in any one of the above methods (7) to (14), the number of the at least one outlet passage is less than the number of the plurality of first cooling passages. A minimum flow-passage cross-sectional area of each of the at least one outlet passage is not smaller than a flow-passage cross-sectional area of each of the plurality of first cooling passages at a connection part between the header portion and the first cooling passages, and a sum of respective minimum flow-passage cross-sectional areas of the at least one outlet passage is smaller than a sum of respective flow-passage cross-sectional areas of the plurality of first cooling passages at the connection part between the header portion and the first cooling passages.

When the flow rate of the cooling medium flowing through each of the plurality of first cooling passages is to be determined according to the flow-passage cross-sectional area of each of the plurality of cooling passages, and the flow-passage cross-sectional area is small, the dimension accuracy of the first cooling passage may decrease due to manufacturing limitations of the high-temperature component, and the accuracy of the flow rate of the cooling medium in the first cooling passage may decrease.

In this regard, according to the above method (15), the sum of the respective minimum flow-passage cross-sectional areas of the one or more outlet passage is smaller than the sum of the respective flow-passage cross-sectional areas of the plurality of first cooling passages at the connection part between the header portion and the first cooling passages, and thus it is possible to determine the flow rate of the cooling medium in the plurality of first cooling passages according to the minimum flow-passage cross-sectional area of the outlet passage. Accordingly, in each of the plurality of first cooling passages, it is unnecessary to excessively reduce the flow-passage cross-sectional area to regulate the flow rate of the cooling medium. Thus, it is possible to improve the dimension accuracy of the first cooling passages, and suppress variation in the flow rate of the cooling medium among the plurality of first cooling passages. Thus, it is possible to suppress excessive cooling while preventing shortage of cooling capacity.

Furthermore, according to the above method (15), the minimum flow-passage cross-sectional area of each of the at least one outlet passage is not smaller than the flow-passage cross-sectional area of each of the plurality of first cooling passages at the connection part between the header portion and the first cooling passages, and thus it is easier to ensure the dimension accuracy of the outlet passage, and suppress clogging of foreign substances in the outlet passage.

Furthermore, according to the above method (15), the number of the at least one outlet passage is less than the number of the first cooling passages, and thus it is possible to reduce the number of parts where the accuracy of the flow-passage cross-sectional area, that is, the dimension accuracy of the passage, needs to be ensured in order to manage the flow rate of the cooling medium, which makes it possible to suppress the production cost of the high-temperature component.

Advantageous Effects

According to an embodiment of at least one embodiment of the present invention, it is possible to provide a high-temperature component that can prevent shortage of cooling capacity.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

In the following description, a high-temperature component according to some embodiments will be described referring to a high-temperature component used in a gas turbine.

Figure 1:
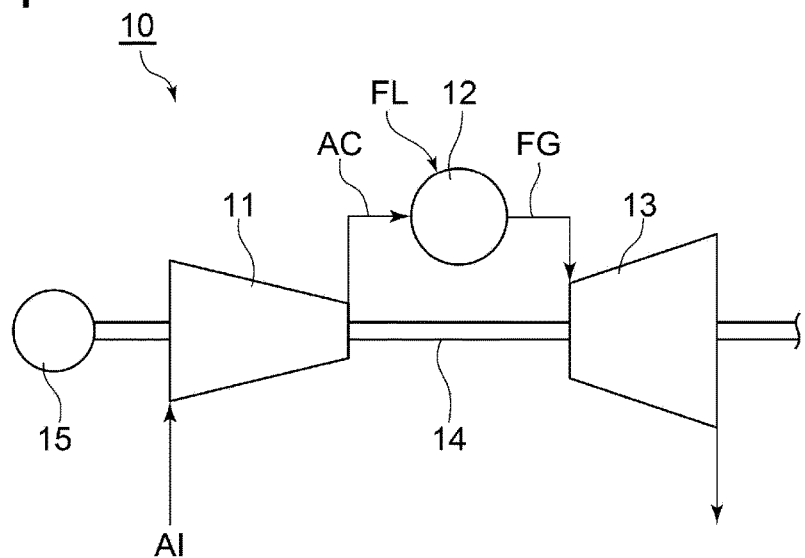
FIG. 1 is a schematic diagram of an overall configuration of a gas turbine.
Figure 2:
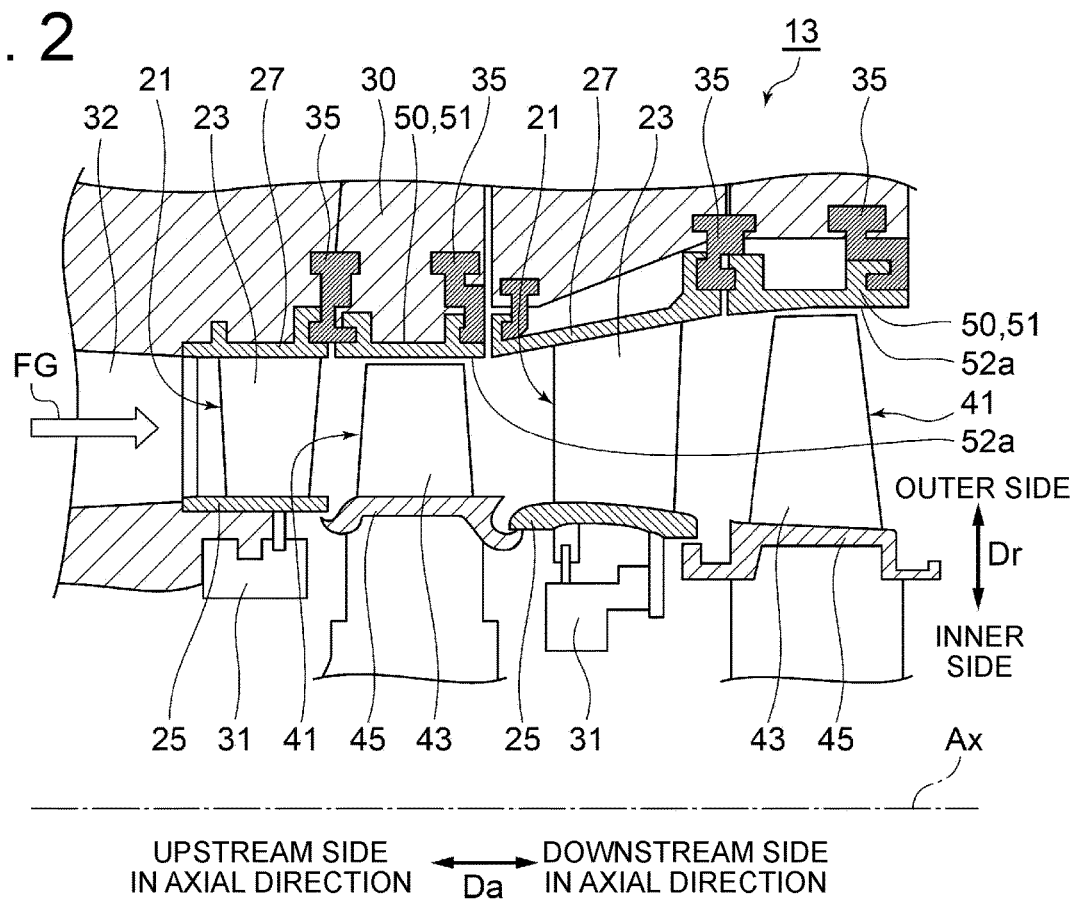
FIG. 2 is a cross-sectional view showing a gas flow passage of a turbine.

FIG. 1 is a schematic diagram of an overall configuration of a gas turbine. FIG. 2 is a cross-sectional view showing a gas flow passage of a turbine.

In the present embodiment, as depicted in FIG. 1, the gas turbine 10 includes a compressor 11, a combustor 12, and a turbine 13 arranged coaxially via a rotor 14. A generator 15 is coupled to an end portion of the rotor 14. In the following description, the extension direction of the axis of the rotor 14 is referred to as the axial direction Da, the circumferential direction about the axis of the rotor 14 is referred to as the circumferential direction Dc, and the direction perpendicular to the axis Ax of the rotor 14 is referred to as the radial direction Dr. Furthermore, of the circumferential direction Dc, the rotational direction of the rotor 14 is indicated as the rotational direction R.

The compressor 11 generates compressed air AC having a high temperature and a high pressure, as air AI sucked in from an air inlet flows through a plurality of stator vanes and a plurality of rotor blades to be compressed. The combustor 12 supplies a predetermined fuel FL to the compressed air AC, and combusts the compressed air, whereby combustion gas FG having a high temperature and a high pressure is generated. The turbine 13 rotary drives the rotor 14 as the high-temperature and high-pressure combustion gas FG generated by the combustor 12 passes through the plurality of stator vanes and the rotor blades, and drives the generator 15 coupled to the rotor 14.

Furthermore, as depicted in FIG. 2, in the turbine 13, the turbine stator vanes (stator vanes) 21 are fixed to an inner shroud 25 at the hub side of airfoil portions 23, and fixed to an outer shroud 27 at the tip side of the airfoil portions 23. The turbine rotor blades (rotor blades) 41 are fixed to a platform 45 at the base end portion of the airfoil portion 43. Furthermore, the outer shroud 27 and a ring segment 50 disposed at the tip end portion side of the rotor blades 41 are supported by the casing (turbine casing) 30 via a heat insulation ring 35, and the inner shroud 25 is supported by a support ring 31. Thus, a combustion gas flow passage 32 through which the combustion gas FG passes is formed along the axial direction Da as a space surrounded by the inner shroud 25, the outer shroud 27, the platform 45, and the ring segment 50.

Furthermore, the inner shroud 25, the outer shroud 27, and the ring segment 50 function as gas path surface forming members. A gas path surface forming member is a member that defines the combustion gas flow passage 32 and has a gas path surface that makes contact with the combustion gas FG.

The combustor 12, the rotor blades 41 (e.g., platform 45), the stator vanes 21 (e.g., the inner shroud 25 and the outer shroud 27) and the ring segment 50, for instance, are high-temperature components used under a high-temperature environment which make contact with the combustion gas FG, and require cooling by a cooling medium. In the following description, the cooling structure of the ring segment 50 will be described as an example of a cooling structure of a high-temperature component.

Figure 3:
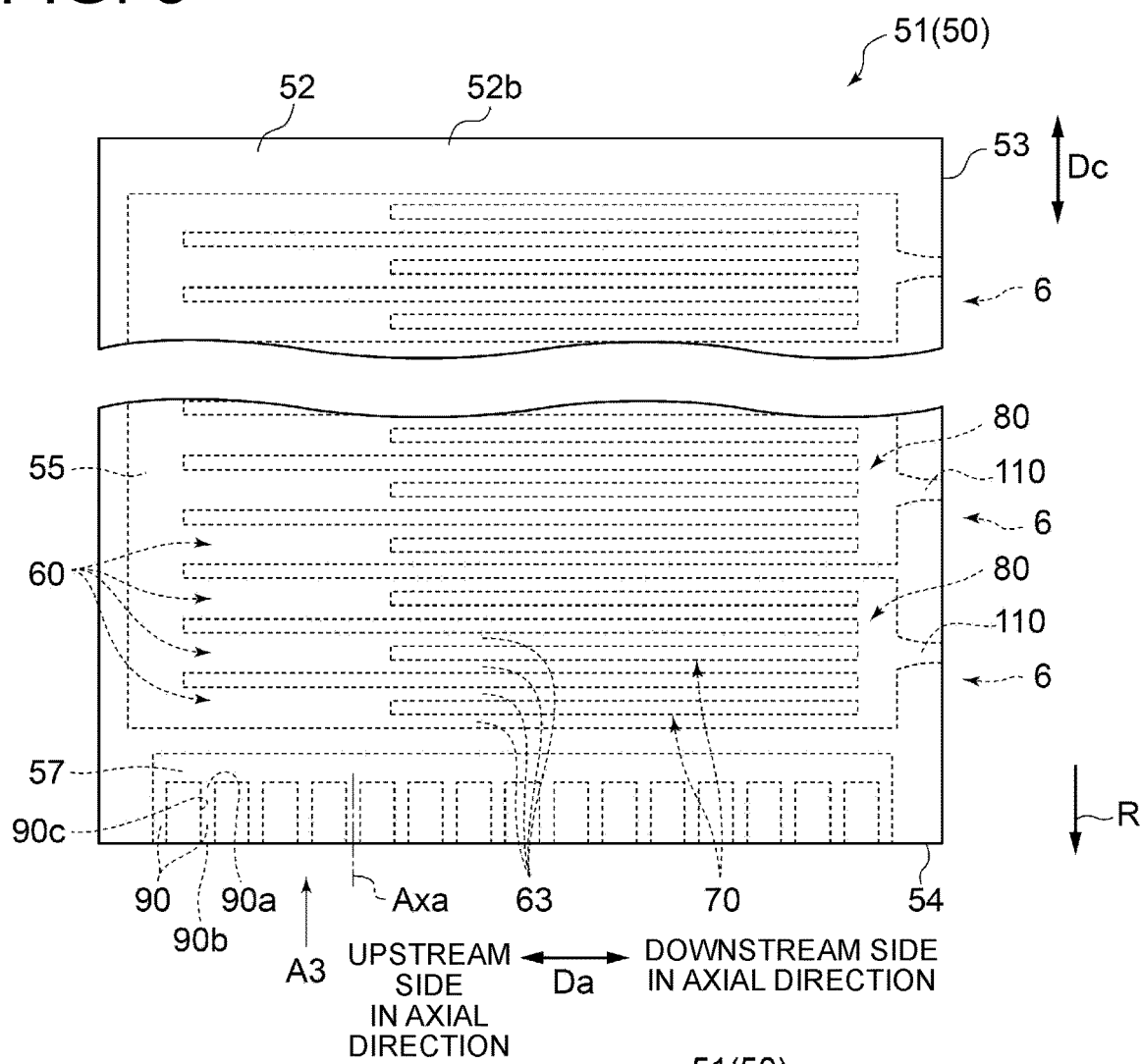
FIG. 3 is a schematic planar view of a segment body according to some embodiments as seen from the outer side in the radial direction, and a schematic side view of the same as seen along the circumferential direction from the downstream side in the rotational direction of the rotor toward the upstream side in the rotational direction of the rotor.
Figure 3:
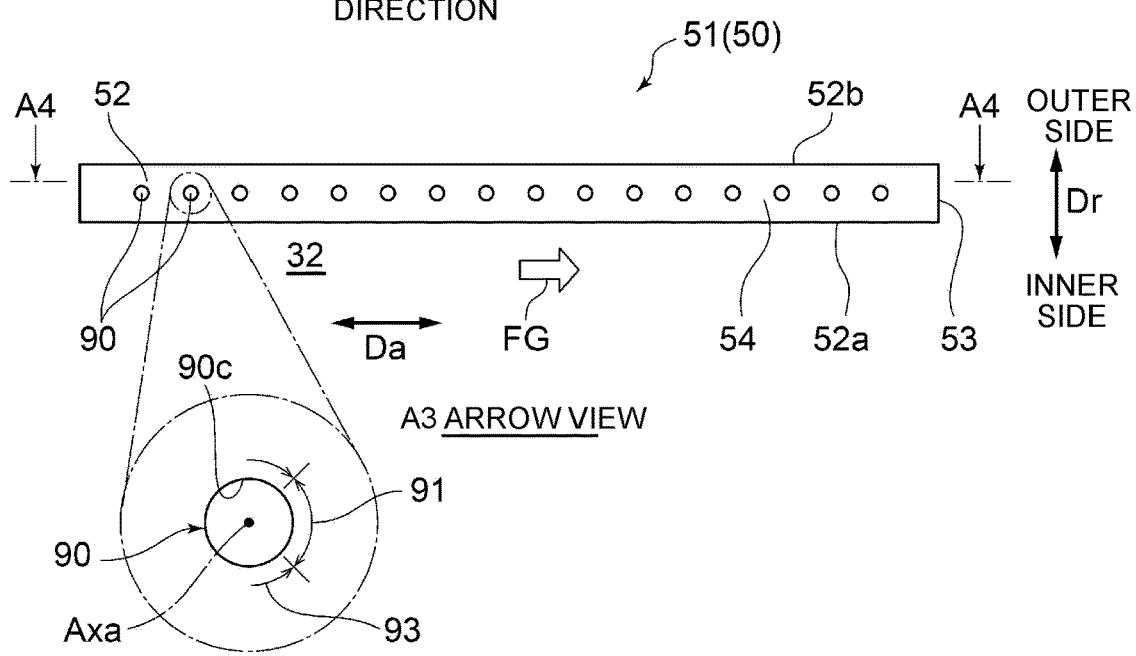
Figure 4:
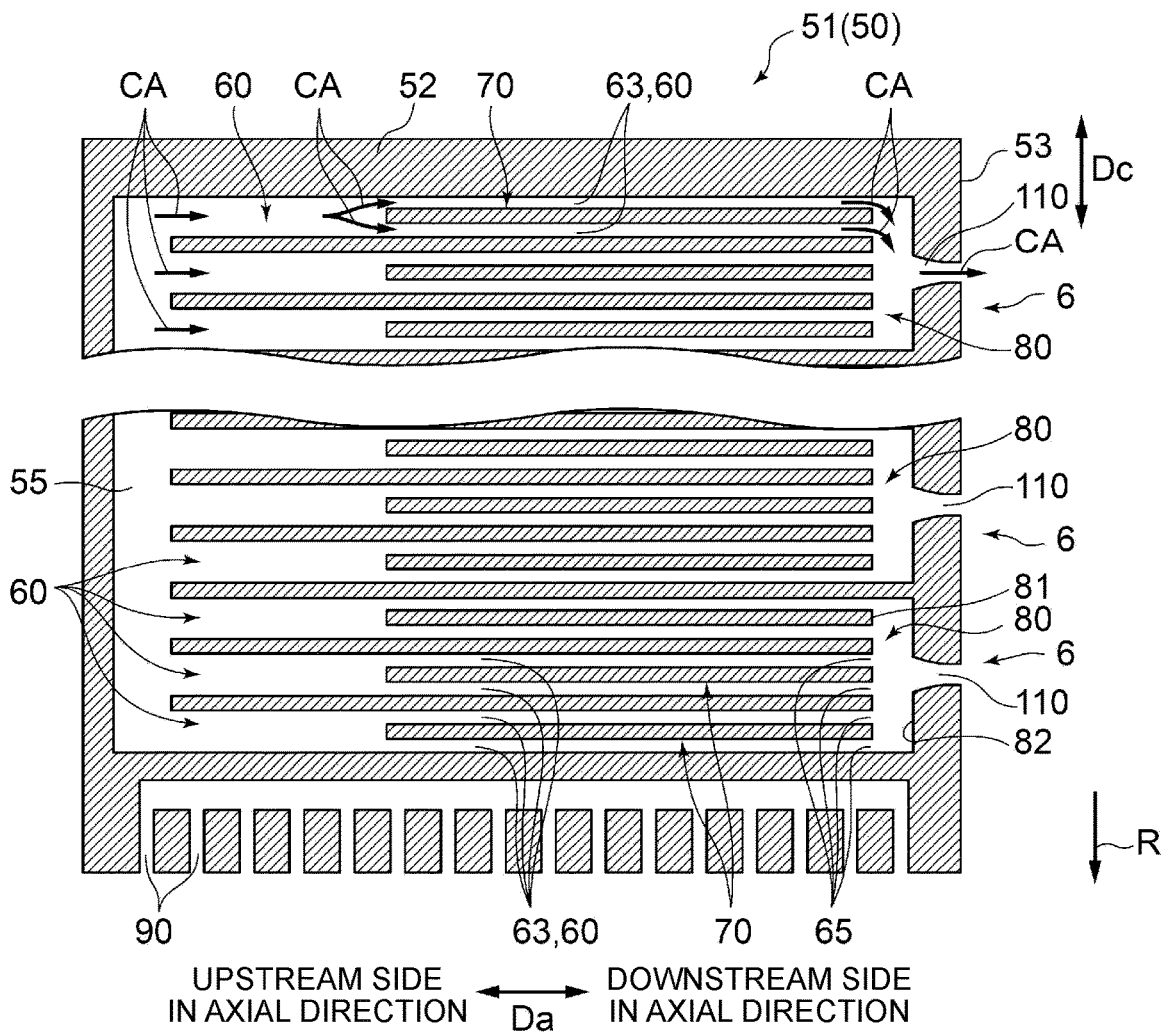
FIG. 4 is a cross-sectional view taken along line A4-A4 in FIG. 3, as seen in the direction of the arrows A4.
Figure 5:
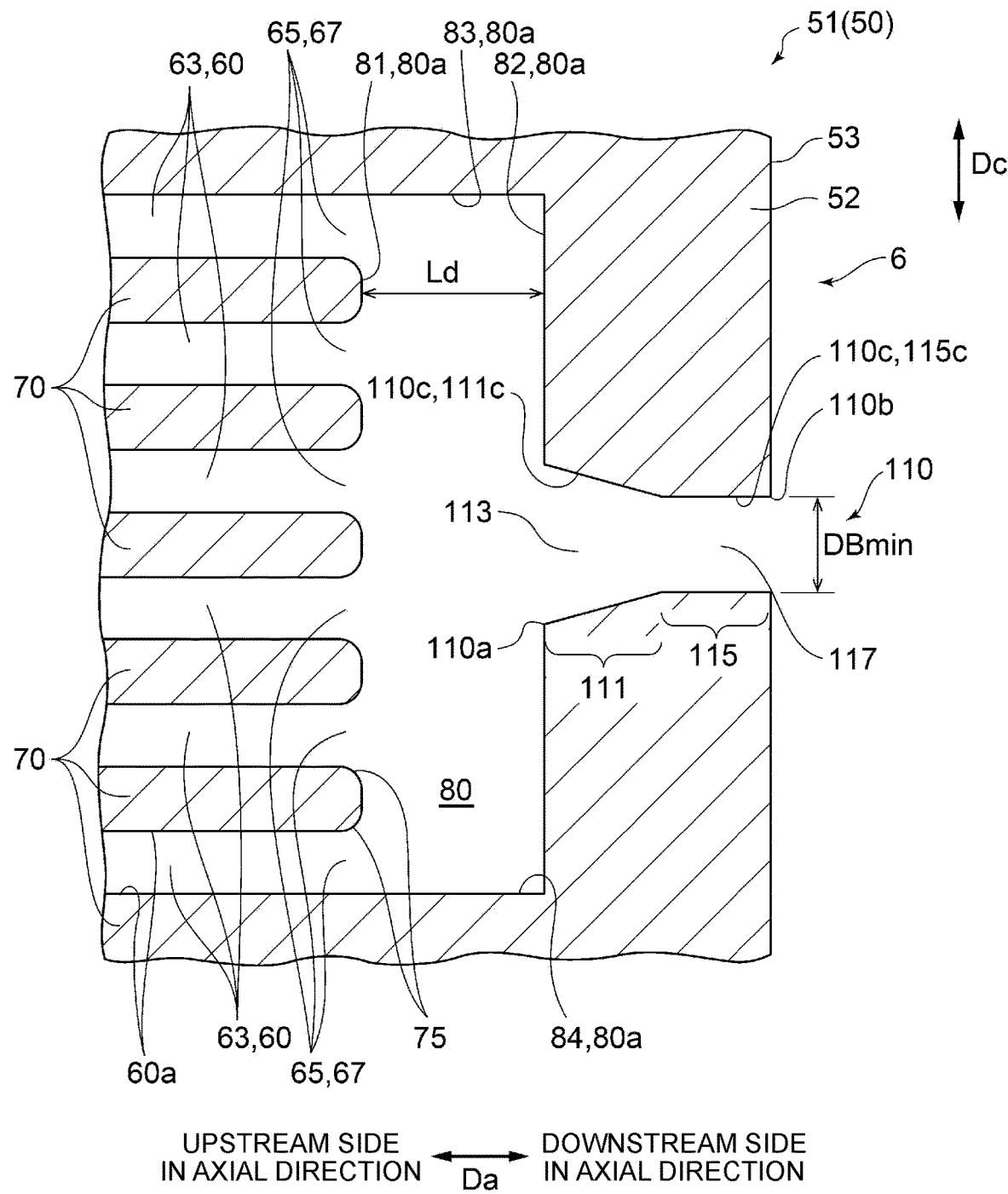
FIG. 5 is an enlarged view of the vicinity of the header portion in FIG. 4.

FIG. 3 is a schematic planar view of one of segment bodies 51 constituting a ring segment 50 according to some embodiments as seen from the outer side in the radial direction Dr, and a schematic side view of the same as seen along the circumferential direction Dc from the downstream side in the rotational direction R of the rotor 14 toward the upstream side in the rotational direction R. FIG. 4 is a cross-sectional view taken along line A4-A4 in FIG. 3, as seen in the direction of the arrows A4. In FIG. 3, the structure of the segment body 51 is depicted schematically. Thus, in FIG. 3 for instance, hooks and the like for attaching the segment body 51 to the heat insulation ring 35 are omitted from drawing. FIG. 5 is an enlarged view of the vicinity of the header portion 80 in FIG. 4.

The ring segment 50 according to some embodiments includes a plurality of segment bodies 51 formed into an annular shape in the circumferential direction Dc. Each segment body 51 includes a body 52 inside which a cooling passage is formed as a main component. As depicted in FIG. 2, the segment body 51 is disposed such that the inner surface 52a in the radial direction Dr faces the combustion gas flow passage 32 through which the combustion gas FG flows. At the inner side of the segment body 51 in the radial direction Dr, rotor blades 41 that rotate about the rotor 14 are arranged at regular intervals. To prevent thermal damage from the high-temperature combustion gas FG, the segment body 51 has a plurality of axial-direction passages (cooling passages) 60 formed thereon, extending in the axial direction Da, and a plurality of side passages (second cooling passages) 90 formed thereon, extending in the circumferential direction Dc in the vicinity of the side portion at the downstream side, in the rotational direction R, of the segment body 51.

The first cooling passages 60 are disposed in parallel in the circumferential direction Dc. The second cooling passages 90 are disposed in parallel in the axial direction Da.

In some embodiments, the circumferential direction Dc for the first cooling passage 60 is referred to as the width direction of the cooling passage 60. Furthermore, in some embodiments, the radial direction Dr orthogonal to the width direction of the first cooling passage 60 is referred to as the height direction of the first cooling passage 60.

Although not depicted, in the gas turbine 10 according to an embodiment, each segment body 51 according to some embodiments is configured to be supplied with cooling air CA from the side of the outer surface 52b. The cooling air CA supplied to the segment body 51 cools the body 52 of the segment body 51 by convective cooling, in the course of flowing through the first cooling passages 60 and the second cooling passages 90 and being discharged into the combustion gas FG.

Hereinafter, the cooling structure of the segment body 51 according to some embodiments will be described.

Each of the first cooling passages 60 according to some embodiments is connected to a cooling air manifold 55 at an upstream end. Inside each of the first cooling passages 60 according to some embodiments, a first partition wall 70 which divides the first cooling passage 60 into a plurality of branch flow passages 63 midway is formed. In some embodiments, the partition wall 70 divides the first cooling passage 60 midway into a pair of branch flow passages 63 in the width direction of the first cooling passage 60.

The cross-sectional shape of the flow passage of the first cooling passage 60 according to some embodiments, that is, the first cooling passage 60 as seen in the extension direction of the first cooling passage 60, in the section upstream of the partition wall 70 and at the branch flow passage 63, may be a rectangular shape, a circular shape, a polygonal shape other than a rectangular shape, or an oval shape. Furthermore, the type of the cross-sectional shape of the flow passage may be different between the branch flow passage 63 and the section at the upstream side of the partition wall 70, of the first cooling passage 60. That is, the cross-sectional shape of the flow passage in the section at the upstream side of the partition wall 70 may be a rectangular shape, and the cross-sectional shape in the branch flow passage 63 may be a circular shape. Furthermore, the cross-sectional shape of the flow passage in the branch flow passage 63 may be a shape that is obtained by dividing a circle or an oval with the partition wall 70.

The first cooling passage 60 cools the inner wall surface of the first cooling passage 60, and thereby cools the segment body 51. Thus, the first cooling passage 60 has a length that is more than five times the equivalent diameter of the first cooling passage 60. The equivalent diameter of the first cooling passage 60 is the diameter of a flow passage that is, when the cross-sectional shape of the first cooling passage 60 is not a circular shape, replaced with a circular shape flow passage that is equivalent from the perspective of the flow of the cooling air CA.

Each of the plurality of branch flow passages 63 has a downstream end 65 connected to the header portion 80. In some embodiment, for instance, the downstream ends 65 of six branch flow passages 63 of adjacent three first cooling passages 60 are connected to an upstream-side inner wall portion 81 of a single header portion 80. In some embodiments, the segment body 51 has a plurality of header portions 80.

Each header portion 80 is a space portion having a cuboid shape, surrounded by: an upstream-side inner wall portion 81 and a downstream-side inner wall portion 82, being a pair of wall portions that face one another in the axial direction Da; lateral-side inner wall portions 83, 84 being a pair of wall portions that face one another in the circumferential direction Dc; and non-depicted inner wall portions being a pair wall portions that face one another in the radial direction Dr.

On the downstream-side inner wall 82 portion of each header portion 80, at least one outlet passage 110 is formed, for discharging the cooling air CA flowing into the header portion 80 to the outside of the header portion 80, that is, the outside of the segment body 51. The outlet passage 110 has an upstream end 110a connected to the downstream-side inner wall portion 82 of the header portion 80, and a downstream-side end portion 111b connected to the downstream-side end portion 53 of the segment body 51 in the axial direction Da.

In the embodiments depicted in FIGS. 3 to 5, the header portion 80 has a single outlet passage 110 in the vicinity of the center, in the circumferential direction Dc, of the downstream-side inner wall portion 82. The outlet passage 110 has an opening which opens into the combustion gas FG at the downstream-side end portion 53 of the segment body 51.

In some embodiments, the segment body 51 includes a plurality of cooling passage groups 6 each of which includes a single header portion 80, three first cooling passages 60 connected to the header portion 80 at the downstream ends, and a single outlet passage 110 connected to the header portion 80. Furthermore, the header portion 80 of one of the cooling passage groups 6 may have two or more outlet passages 110 connected thereto.

The cooling air CA supplied to the segment body 51 from the outside of the segment body 51 is supplied to the cooling air manifold 55, and then distributed to each of the first cooling passages 60 from the cooling air manifold 55. The cooling air CA distributed to each of the first cooling passages 60 is divided by the partition wall 70, and then flows into each branch flow passage 63. After flowing into each branch flow passage 63, the cooling air CA is collected in each header portion 80, and then discharged outside of the segment body 51 from the outlet passage 110.

Each of the second cooling passages 90 according to some embodiments is connected to a cooling air manifold 57 at an upstream end 90a. Each of the second cooling passages 90 has an opening which opens into the combustion gas FG at an end portion 54 of the segment body 51 in the circumferential direction Dc. The end portion 54 of the segment body 51 is oriented toward the downstream side in the rotational direction R of the rotor 14.

The cooling air CA supplied to the segment body 51 from the outside of the segment body 51 is supplied to the cooling air manifold 57, and then distributed to each of the second cooling passages 90 from the cooling air manifold 57. The cooling air CA distributed to each of the second cooling passages 90 is discharged outside the segment body 51 from the downstream end 90b.

In some embodiments, as depicted in FIGS. 3 to 5, in the segment body 51, the number of the outlet passage 110 connected to a single header portion 80 is less than the number of plurality of first cooling passages 60 connected to the single header portion 80. For instance, in some embodiments, as depicted in FIGS. 3 to 5, six first cooling passages 60 (six branch flow passages 63) divided by the partition wall 70 and a single outlet passage 110 are connected to a single header portion 80.

In some embodiments, as well depicted in FIG. 5, the outlet passage 110 includes an upstream region 111 and a downstream region 115. In the upstream region 111, a flow-passage cross-sectional area reduction portion 113 where the flow-passage cross-sectional area decreases gradually toward the downstream side is formed. In the downstream region 115, a minimum flow-passage cross-sectional area portion 117 where the flow-passage cross-sectional area is the smallest is formed.

In some embodiments, the cross-sectional shape of the flow passage of the outlet passage 110 as seen in the extension direction of the outlet passage 110 is a circular shape in the upstream region 111 and the downstream region 115. However, the cross-sectional shape of the flow passage of the outlet passage 110 may be, in the upstream region 111 and the downstream region 115, a rectangular shape, a polygonal shape other than a rectangular shape, or an oval shape. Furthermore, the type of the cross-sectional shape of the flow passage may be different between the upstream region 111 and the downstream region 115. That is, the cross-sectional shape of the flow passage in the upstream region 111 may be a rectangular shape, and the cross-sectional shape of the flow passage in the downstream region 115 may be a circular shape.

In the following description, also taking into account the case where the cross-sectional shape of the flow passage in the downstream region 115 is not a circular shape, when the size of the flow passage is mentioned regarding the downstream region 115 (minimum flow-passage cross-sectional area portion 117), the equivalent diameter of the minimum flow-passage cross-sectional area portion 117 will be used in the description.

The equivalent diameter of the minimum flow-passage cross-sectional area portion 117 is the diameter of the minimum flow-passage cross-sectional area portion 117, when the cross-sectional shape of the minimum flow-passage cross-sectional area portion 117 is not a circular shape, replaced with a circular shape that is equivalent from the perspective of the flow of the cooling air CA. When the cross-sectional shape of the minimum flow-passage cross-sectional area portion 117 is a circular shape, the equivalent diameter of the minimum cross-sectional shape portion 117 is the diameter of the minimum flow-passage cross-sectional area portion 117.

For a high-temperature component that requires cooling by the cooling air CA like the segment body 51 according to some embodiments, the roughness of the inner wall surface 60a of the first cooling passage 60 formed inside should be rough in order to improve the cooling capacity. However, when the surface roughness of the inner wall surface 60a of the first cooling passage 60 is rough, the pressure loss of the cooling air CA increases. In particular, in a case where the first cooling passage 60 may have an elaborate and complicated shape like that of the segment body 51, the surface roughness of the inner wall surface has a significant influence on the pressure loss. In an extreme case, the flow rate of the cooling air CA may decrease considerably.

Thus, in some embodiments, the cooling structure of the segment body 51 has a configuration described below, in order to prevent shortage of cooling capacity.

In some embodiments, in the segment body 51, the roughness of the inner wall surface 110c of the outlet passage 110 is not greater than the roughness of the inner wall surface 60a of the plurality of first cooling passages 60, at the downstream region 115 being a region where the flow-passage cross-sectional area of the outlet passage 110 is the smallest, that is, the minimum flow-passage cross-sectional area portion 117.

With the segment body 51 according to some embodiments, the roughness of the inner wall surface 60a of the plurality of first cooling passages 60 is not smaller than the roughness of the inner wall surface 115c of the outlet passage 110 in the downstream region 115 of the outlet passage 110, and thus it is possible to improve the cooling capacity of the first cooling passages 60. Further, with the segment body 51 according to some embodiments, the roughness of the inner wall surface 115c of the outlet passage in the downstream region 115 is not greater than the inner wall surface 60a of the plurality of cooling passages 60, and thus it is possible to suppress variation in the pressure loss at the outlet passage 110, and let foreign substances pass through the outlet passage 110 more easily, thereby reducing the risk of clogging of the outlet passage 110.

When the segment body 51 according to some embodiments has the following configurations (A) and (B), it is possible to improve the accuracy in regulation of the flow rate of the cooling air CA, as described below.

(A) In the segment body 51, the minimum flow-passage cross-sectional area SBmin of the outlet passage 110 is not smaller than the flow-passage cross-sectional area SA of each of the plurality of first cooling passages 60 (branch flow passages 63) at the connection part 67 between the header portion 80 and the first cooling passages 60.

When two or more outlet passages 110 are connected to a single header portion 80, the minimum flow-passage cross-sectional area SBmin of each of the outlet passages 110 connected to the single header portion 80 is not smaller than the flow-passage cross-sectional area SA of each of the plurality of first cooling passages 60 at the connection part 67.

(B) As depicted in FIGS. 3 to 5, in the segment body 51, the minimum flow-passage cross-sectional area SBmin of the outlet passage 110 is smaller than the sum $\Sigma SA$ of the respective flow-passage cross-sectional areas SA, at the connection part 67, of the plurality of first cooling passages 60 (branch flow passages 63) connected to the single header portion 80.

When two or more outlet passages 110 are connected to a single header portion 80, the sum $\Sigma SBmin$ of the respective minimum flow-passage cross-sectional areas SBmin of the outlet passages 110 connected to the single header portion 80 is smaller than the sum $\Sigma SA$ of the respective flow-passage cross-sectional areas SA of the plurality of first cooling passages 60 connected to the single header portion 80.

As described below, the segment body 51 can be formed by metal additive fabrication or precision casting, for instance. Thus, when the flow-passage cross-sectional area SA of the first cooling passage 60 is small, the dimension accuracy of the first cooling passage 60 tends to decrease due to the manufacturing limitations of the segment body 51.

In a case where the flow rate of the cooling air CA flowing through each of the plurality of cooling passages 60 is to be determined with the flow-passage cross-sectional area SA of each of the plurality of cooling passages 60, when the flow-passage cross-sectional area SA is small, the dimension accuracy of the first cooling passage 60 may decrease as described above, and the accuracy of the flow rate of the cooling air CA in the first cooling passage 60 may decrease.

In this regard, with the segment body 51 according to some embodiments, the sum $\Sigma SBmin$ of the respective minimum flow-passage cross-sectional areas SBmin of the one or more outlet passage 110 is smaller than the sum $\Sigma SA$ of the respective flow-passage cross-sectional areas of the plurality of first cooling passages 60 at the connection part 67, and thus it is possible to determine the flow rate of the cooling air CA in the plurality of first cooling passages 60 with the minimum flow-passage cross-sectional area SBmin of the outlet passage 110. Accordingly, in each of the plurality of first cooling passages 60, it is unnecessary to excessively reduce the flow-passage cross-sectional area SA to regulate the flow rate of the cooling air CA. Thus, it is possible to improve the dimension accuracy of the first cooling passages 60, and suppress variation in the flow rate of the cooling air CA among the plurality of first cooling passages 60. Thus, it is possible to suppress excessive cooling while preventing shortage of cooling capacity.

Furthermore, with the segment body 51 according to some embodiments, the minimum flow-passage cross-sectional area SBmin of each of the at least one outlet passage 110 is not smaller than the flow-passage cross-sectional area SA of each of the plurality of first cooling passages 60 at the connection part 67, and thus it is easier to ensure the dimension accuracy of the outlet passage 110 in the radial direction, and suppress clogging of foreign substances in the outlet passage 110.

Furthermore, with the segment body 51 according to some embodiments, the number of the at least one outlet passage 110 is less than the number of the first cooling passages 60, and thus it is possible to reduce the number of parts where the accuracy of the flow-passage cross-sectional area, that is, the dimension accuracy of the passage, needs to be ensured in order to manage the flow rate of the cooling air CA, and thereby suppress the production cost of the segment body 51.

Furthermore, as described above, with the roughness of the inner wall surface 110c of the outlet passage 110 being as described above, it is possible to reduce variation of the pressure loss in the outlet passage 110, and improve the accuracy in regulation of the flow rate of the cooling air CA.

In some embodiments, the inner wall surface 110c of the outlet passage 110 has a center-line mean roughness Ra of not greater than 10 μm, in the downstream region 115. Further, in some embodiments, the inner wall surface 60a of the plurality of first cooling passages 60 have a center-line mean roughness Ra of not smaller than 10 μm and not greater than 20 μm.

With the segment body 51 according to some embodiments, the inner wall surface 60a of the plurality of first cooling passages 60 has the above roughness, and thus it is possible to improve the cooling capacity of the first cooling passages 60. Further, with the segment body 51 according to some embodiments, the inner wall surface 115c in the downstream region 115 of the outlet passage 110 has the above roughness and thus it is possible to suppress variation in the pressure loss at the outlet passage 110, and let foreign substances pass through the outlet passage 110 more easily, thereby reducing the risk of clogging of the outlet passage 110.

In some embodiments, the segment body 51 further includes a plurality of second cooling passages 90 that extend in an extension direction which intersects with the extension direction of the plurality of first cooling passages 60. In some embodiments, the inner wall surface 90c of the plurality of second cooling passages 90 has a center-line mean roughness Ra of not smaller than 10 μm and not greater than 50 μm.

With the segment body 51 according to some embodiments, the inner wall surface 90c of the plurality of second cooling passages 60 has the above roughness, and thus it is possible to improve the cooling capacity of the second cooling passages 90.

Furthermore, as described below, in a case where the segment body 51 is formed by laminating from the upstream side toward the downstream side of the first cooling passages 60 by metal additive fabrication, of the second cooling passage 90, the inner wall surface 90c at the downstream side, in the axial direction Da, of the axis Axa of the second cooling passage 90 becomes an overhang portion, which has a space portion in a region vertically below, upon additive fabrication. Thus, as depicted in FIG. 3, of the inner wall surface 90c of the second cooling passage 90, the roughness in the overhang region 91 where the overhang angle is not smaller than a predetermined angular degree, for instance 45 angular degrees, upon additive fabrication, that is, lamination of a material powder, tends to be greater compared to that in the region 93 other than the overhang region 91.

Thus, in some embodiments, the segment body 51 may be formed such that the segment body 51 has a center-line mean roughness Ra of not smaller than 30 μm and not greater than 50 μm in the overhang region 91, by utilizing that the roughness tends to be greater in the overhang region 91 than in the other region 93 as described above. Furthermore, in the other region 93, the segment body 51 may be formed so as to have a center-line mean roughness Ra of not smaller than 10 μm and not greater than 30 μm. That is, by utilizing the above tendency in metal additive fabrication, it is possible to have an increased roughness in a partial region of the inner wall surface 90c of the second cooling passages 90. Accordingly, it is possible to improve the cooling capacity in the second cooling passages 90.

Furthermore, in a case where the pressure loss of the cooling air CA becomes too high due to the increased roughness of the inner wall surface 90c of the second cooling passages 90, the segment body 51 may be formed such that the inner diameter of the second cooling passages 90 is greater than the design value.

In some embodiments, the outlet passage 110 includes a flow-passage cross-sectional area reduction portion 113 where the flow-passage cross-sectional area of the outlet passage 110 gradually decreases toward the downstream side.

Accordingly, by adjusting the size in a direction orthogonal to the extension direction of the outlet passage 110 from the downstream side of the flow-passage cross-sectional area portion 113, it is possible to adjust the minimum flow-passage cross-sectional area SBmin at the outlet passage 110 more easily. Thus, in a case where the segment body 51 is configured such that the flow rate of the cooling air CA in the segment body 51 is to be determined with the size of the minimum flow-passage cross-sectional area SBmin at the outlet passage 110 as described above, it is possible to manage the flow rate of the cooling air CA by managing the dimension in a direction orthogonal to the extension direction of the outlet passage 110 at the downstream side of the outlet passage 110. Accordingly, it is possible to narrow the region where the accuracy of the flow-passage cross-sectional area, that is, the dimension accuracy of the passage, needs to be ensured, and suppress the production cost of the segment body 51.

In some embodiments, the roughness in at least a partial region of the inner wall surface 80a of the header portion 80 may be not greater than the roughness of the inner wall surface 60a of the plurality of first cooling passages 60.

The downstream ends 65 of the plurality of first cooling passages 60 are connected to the header portion 80. Thus, at the header portion 80, the space volume at the header portion 80 increases, and the flow rate of the cooling air CA at the header portion 80 decreases, which decreases the coefficient of heat transfer to the cooling air. Thus, design of the segment body 51 takes into account the decrease in the cooling passage at the header portion 80 compared to the first cooling passage 60, that is, the relatively small contribution to cooling of the segment body 51.

With the segment body 51 according to some embodiments, the roughness in at least a partial region of the inner wall surface 80a of the header portion 80 is not greater than the roughness of the inner wall surface 60a of the plurality of first cooling passages 60, and thus it is possible to suppress pressure loss at the header portion 80. As described above, contribution to the segment body 51 is relatively small at the header portion 80, and thus the influence of the decreased roughness of the header portion 80 on cooling of the segment body 51 is small. Thus, it is possible to suppress impact on cooling of the segment body 51 and suppress pressure loss of the cooling air CA.

Furthermore, to suppress pressure loss of the cooling air CA, the region of the inner wall surface 80a of the header portion 80 where the roughness is not greater than that of the inner wall surface 60a of the first cooling passages 60 should preferably be connected up to the upstream end 110a of the outlet passage 110, and more preferably, up to the downstream region 115.

(Method of Producing the Segment Body 51)

Figure 6:
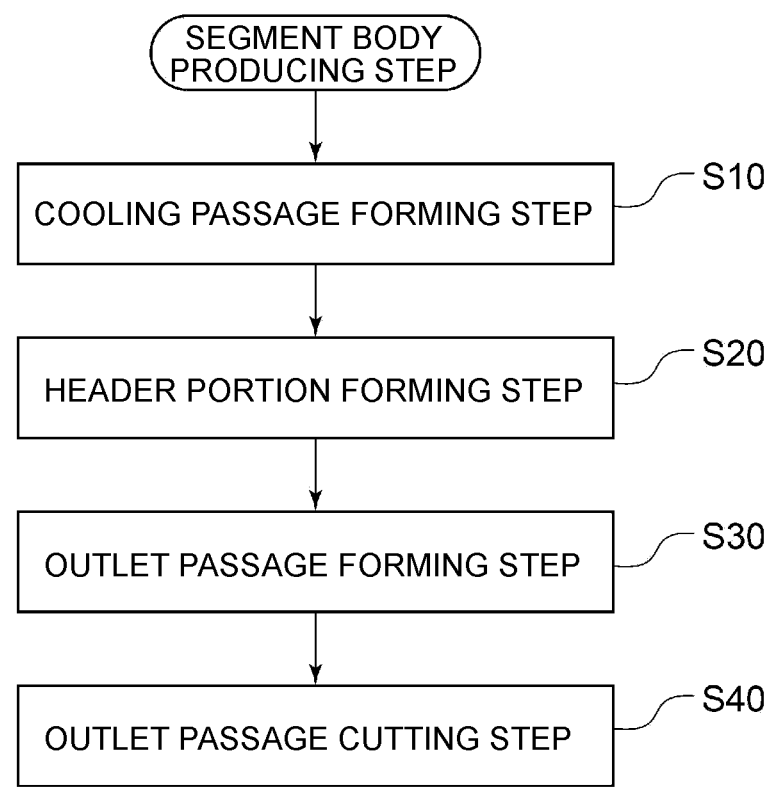
FIG. 6 is a flow chart showing an example of the producing process for producing a segment body according to some embodiments by metal additive fabrication.

Hereinafter, the method of producing the segment body 51 according to some embodiments described above will be described. The segment body 51 according to some embodiments can be produced by metal additive fabrication or precision casting, for instance. FIG. 6 is a flow chart showing an example of the producing procedure of producing a segment body 51 according to some embodiments by metal additive fabrication. The method of producing the segment body 51 according to some embodiments includes a cooling passage forming step S10, a header portion forming step S20, an outlet passage forming step S30, and an outlet passage cutting step S40.

According to some embodiments, the method of forming the segment body 51 may be, for instance, the powder bed method, the metal deposition method, the binder jetting method, or any other method other than the above. In the following description, the method of forming the segment body 51 according to some embodiments is the power bed method, or the metal deposition method.

The cooling passage forming step S10 is a step of forming a plurality of first cooling passages 60 and second cooling passages 90 through which the cooling air CA is able to flow. In the cooling passage forming step S10, for instance, a material powder is laminated from the upstream side in the axial direction Da toward the downstream side in the axial direction Da to form the segment body 51 to the downstream ends 65 of the first cooling passage 60, for instance.

The header portion forming step S20 is a step of forming a header portion 80 to which the downstream ends 65 of the plurality of first cooling passages 60 are connected. In the header portion forming step S20, for instance, subsequent to the cooling passage forming step S10, a material powder is laminated from the upstream side in the axial direction Da toward the downstream side in the axial direction Da to form the segment body 51 to the downstream-side inner wall portion 82 of the header portion 80.

The outlet passage forming step S30 is a step of forming the at least one outlet passage 110 for discharging the cooling air CA flowing into the header portion 80 to the outside of the header portion 80. In the outlet passage forming step S30, for instance, subsequent to the header portion forming step S20, a material powder is laminated from the upstream side in the axial direction Da toward the downstream side in the axial direction Da to form the segment body 51 to the downstream ends 110b of the outlet passage 110, for instance.

Furthermore, the outlet passage forming step S30 includes forming the outlet passage 110 so as to include a flow-passage cross-sectional area reduction portion 113 where the flow-passage cross-sectional area of the outlet passage 110 gradually decreases toward the downstream side.

Figure 7:
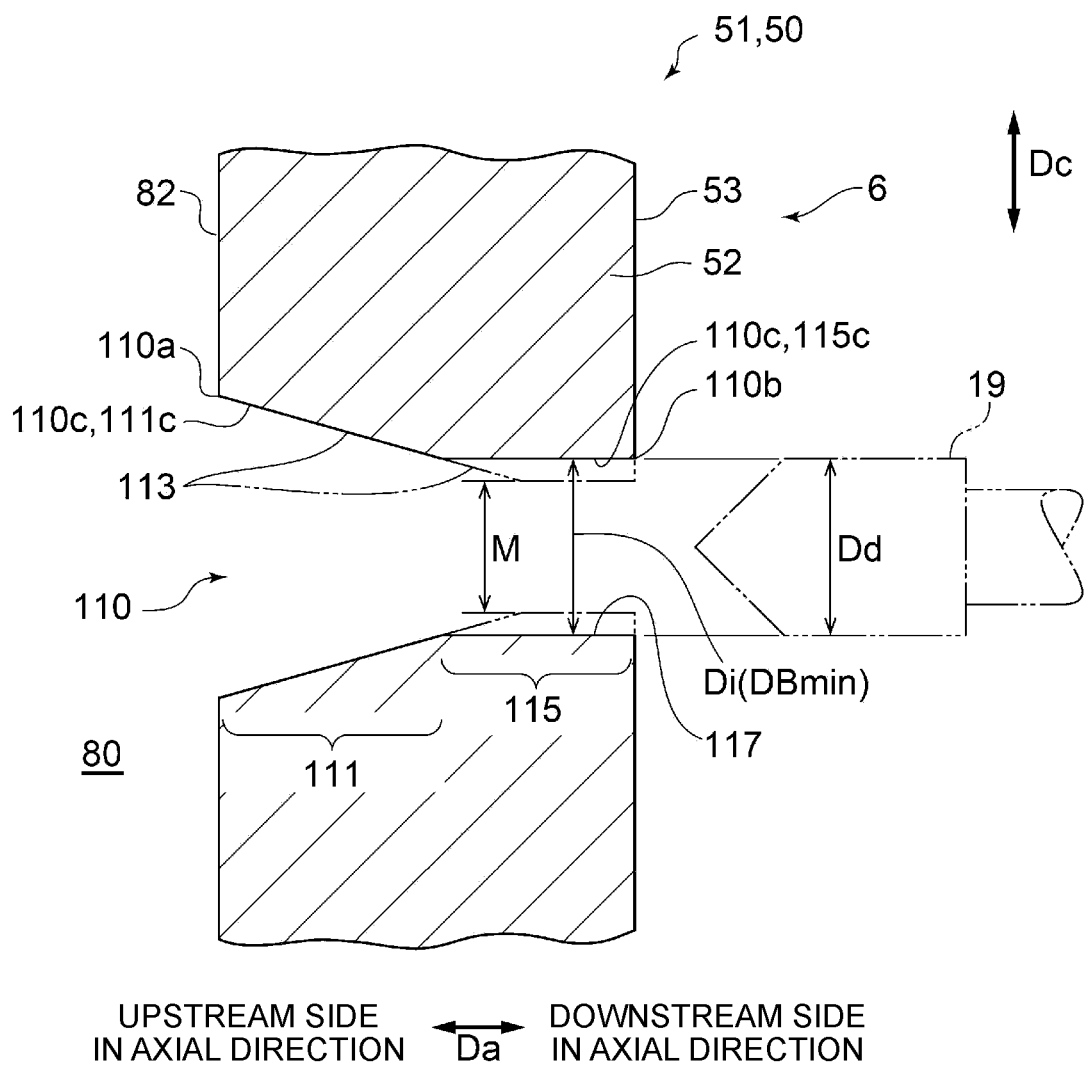
FIG. 7 is a diagram for describing the outlet passage cutting step.

FIG. 7 is a diagram for describing the outlet passage cutting step S40 described below. In FIG. 7, the two-dotted chain line indicates a conical drill 19 and the shape at the downstream side of the outlet passage 110 before the outlet passage 110 is cut out by the conical drill 19 in the outlet passage cutting step S40.

In the outlet passage forming step S30 according to some embodiments, the downstream side of the outlet passage 110 is formed such that the dimension in a direction orthogonal to the extension direction of the outlet passage 110 at the downstream side of the outlet passage 110 is smaller than the diameter Dd of the conical drill 19. That is, in the outlet passage forming step S30 according to some embodiments, for the outlet passage 110 before carrying out the outlet passage cutting step S40, a flow-passage cross-sectional area reduction portion 113 is formed such that the dimension M at the most downstream side of the flow-passage cross-sectional area reduction portion 113 in a direction orthogonal to the extension direction of the outlet passage 110 is smaller than the diameter Dd of the conical drill 19.

The outlet passage cutting step S40 is a step of applying machine processing on at least a part of the inner wall surface 110c of the outlet passage 110. Specifically, the outlet passage cutting step S40 is a step of cutting the outlet passage 110 with the conical drill 19. In the outlet passage cutting step 40, machine processing is applied to the outlet passage 110 with the conical drill 19 from the downstream end 110b toward the upstream end 110a of the outlet passage 110. Accordingly, the inner diameter in a partial section toward the upstream side from the downstream end 110b is constant, and the section becomes the downstream region 115.

Furthermore, the cooling passage forming step S10 and the header portion forming step S20 may not necessarily be carried out by metal additive fabrication, and may be carried out by precision casting. Furthermore, the outlet passage forming step S30 may be carried out by metal additive fabrication. Furthermore, the cooling passage forming step S10 to the outlet passage forming step S30 may be carried out by precision casting.

In the method of producing the segment body 51 according to some embodiments, the segment body 51 is formed such that the number of the outlet passage 110 connected to a single header portion 80 is less than the number of plurality of first cooling passages 60 connected to a single header portion 80.

Furthermore, in the method of producing the segment body 51 according to some embodiments, the segment body 51 is formed such that the minimum flow-passage cross-sectional area SBmin of the outlet passage 110 is not smaller than the flow-passage cross-sectional area SA of each of the plurality of first cooling passages 60 (branch flow passages 63) at the connection part 67 between the header portion 80 and the first cooling passages 60.

Furthermore, in the method of producing the segment body 51 according to some embodiments, the segment body 51 is formed such that the minimum flow-passage cross-sectional area SBmin of the outlet passage 110 is smaller than the sum $\Sigma$SA of the respective flow-passage cross-sectional areas SA, at the connection part 67, of the plurality of first cooling passages 60 (branch flow passages 63) connected to a single header portion 80.

Furthermore, when forming the segment body 51 such that two or more outlet passages 110 are connected to a single header portion 80, the segment body 51 is formed such that the minimum flow-passage cross-sectional area SBmin of each of the outlet passages 110 connected to the single header portion 80 is not smaller than the flow-passage cross-sectional area SA of each of the plurality of first cooling passages 60 at the connection part 67.

Furthermore, when the segment body 51 is formed such that two or more outlet passages 110 are connected to a single header portion 80, the segment body 51 is formed such that the sum $\Sigma$SBmin of the respective minimum flow-passage cross-sectional areas SBmin of the outlet passages 110 connected to the single header portion 80 is smaller than the sum ΣSA of the respective flow-passage cross-sectional areas SA, at the connection part 67, of the plurality of first cooling passages 60 connected to the single header portion 80.

According to the method of producing the segment body 51 according to some embodiments, the sum ΣSBmin of the respective minimum flow-passage cross-sectional areas SBmin of the one or more outlet passage 110 is smaller than the sum ΣSA of the respective flow-passage cross-sectional areas of the plurality of first cooling passages 60 at the connection part 67, and thus it is possible to determine the flow rate of the cooling air CA in the plurality of first cooling passages 60 with the minimum flow-passage cross-sectional area SBmin of the outlet passage 110. Accordingly, in each of the plurality of first cooling passages 60, it is unnecessary to excessively reduce the flow-passage cross-sectional area to regulate the flow rate of the cooling air CA. Thus, it is possible to improve the dimension accuracy of the first cooling passages 60, and suppress variation in the flow rate of the cooling air CA among the plurality of first cooling passages 60. Thus, it is possible to suppress excessive cooling while preventing shortage of cooling capacity.

Furthermore, according to the method of producing the segment body 51 according to some embodiments, the minimum flow-passage cross-sectional area SBmin of the at least one outlet passage 110 is not smaller than the flow-passage cross-sectional area SA of each of the plurality of first cooling passages 60 at the connection part 67, and thus it is easier to ensure the dimension accuracy of the outlet passage 110, and suppress clogging of foreign substances in the outlet passage 110.

Furthermore, according to the method of producing the segment body 51 according to some embodiments, the number of the at least one outlet passage 110 is less than the number of the first cooling passages 60, and thus it is possible to reduce the number of parts where the accuracy of the flow-passage cross-sectional area, that is, the dimension accuracy of the passage, needs to be ensured in order to manage the flow rate of the cooling air CA, and thereby suppress the production cost of the segment body 51.

In the method of producing the segment body 51 according to some embodiments, in the downstream region 115 being a region where the flow-passage cross-sectional area of the outlet passage 110 is the smallest, the outlet passage is formed such that the roughness of the inner wall surface 110c of the outlet passage 110 is not greater than the roughness of the inner wall surface 60a of the plurality of first cooling passages 60.

According to the method of producing the segment body 51 according to some embodiments, the roughness of the inner wall surface 60a of the plurality of first cooling passages 60 is not smaller than the roughness of the inner wall surface 115c in the downstream region 115 of the outlet passage 110, and thus it is possible to improve the cooling capacity of the first cooling passages 60. Furthermore, according to the method of producing the segment body 51 according to some embodiments, the roughness of the inner wall surface 115c in the downstream region 115 of the outlet passage 110 is not greater than the inner wall surface 60a of the plurality of cooling passages 60, and thus it is possible to suppress variation in the pressure loss at the outlet passage 110, and let foreign substances pass through the outlet passage 110 more easily, thereby reducing the risk of clogging of the outlet passage 110.

According to the method of producing the segment body 51 according to some embodiments, by adjusting the size in a direction orthogonal to the extension direction of the outlet passage 110 from the downstream side of the flow-passage cross-sectional area portion 113, it is possible to adjust the minimum flow-passage cross-sectional area SBmin at the outlet passage 110 more easily. Thus, in a case where the segment body 51 is configured such that the flow rate of the cooling air CA in the segment body 51 is to be determined with the size of the minimum flow-passage cross-sectional area SBmin at the outlet passage 110, it is possible to manage the flow rate of the cooling air CA by managing the dimension in a direction orthogonal to the extension direction of the outlet passage 110 at the downstream side of the outlet passage 110. Accordingly, it is possible to narrow the region where the accuracy of the flow-passage cross-sectional area, that is, the dimension accuracy of the passage, needs to be ensured, and suppress the production cost of the segment body 51.

According to the method of producing the segment body 51 according to some embodiments, it is possible to suppress the production cost of the segment body 51 compared to a case in which the outlet passage 110 is formed merely by machine processing. Furthermore, according to the method of producing the segment body 51 according to some embodiments, compared to a case in which the outlet passage 110 is formed by metal additive fabrication or precision casting alone, it is possible to improve the dimension accuracy of the inner wall surface 110c of the outlet passage 110, and improve the accuracy in regulation of the flow rate of the cooling air CA. Furthermore, according to the method of producing the segment body 51 according to some embodiments, it is possible to adjust the dimension of the inner wall surface 110c of the outlet passage 110 while confirming the flow rate of the cooling air AC, and thus it is possible to suppress excess and shortage of the flow rate of the cooling air AC.

According to the method of producing the segment body 51 according to some embodiments, it is possible to determine the dimension of the inner wall surface 110c of the outlet passage 110, more specifically, the inner diameter Di of the minimum flow-passage cross-sectional area portion 117 according to the diameter Dd of the conical drill 19, and thus it is possible to produce the segment body 51 easily.

In the outlet passage forming step S30 according to some embodiments, the outlet passage 110 may be formed by etching at least a partial section of the outlet passage 110 including the downstream region 115, such that the roughness of the inner wall surface 110c of the outlet passage 110 is not greater than the roughness of the inner wall surface 60a of the plurality of first cooling passages 60 in the region.

Accordingly, it is possible to easily reduce the roughness in at least a partial region of the outlet passage 110 including the downstream region 115. Furthermore, even in a region where it is difficult to apply machine processing from the downstream end 110b of the outlet passage 110, it is possible to easily decrease the roughness.

Figure 8:
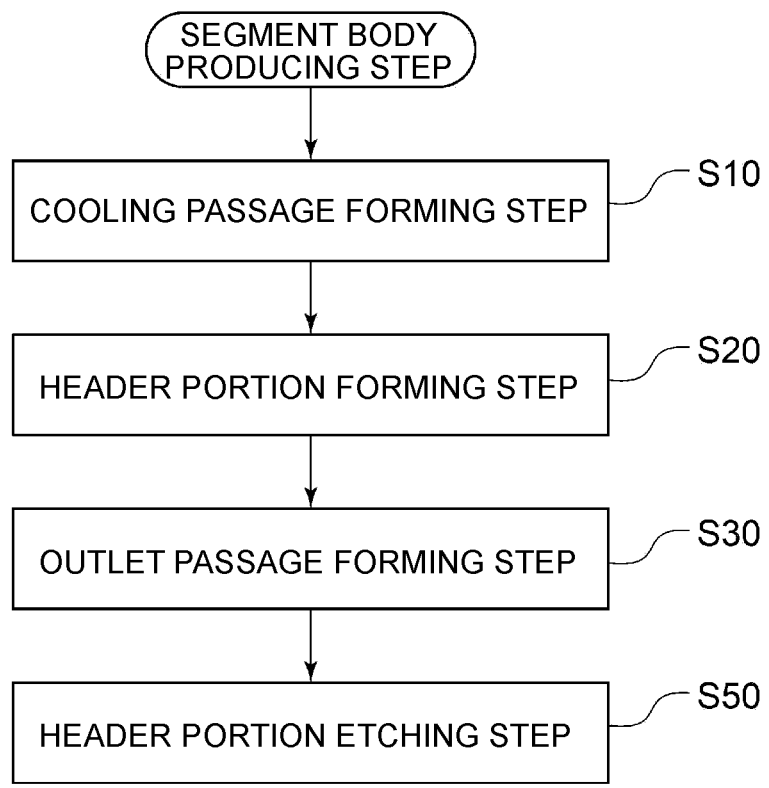
FIG. 8 is a flowchart showing an example of the processing procedure in the method of producing a segment body according to another embodiment.

FIG. 8 is a flowchart showing an example of the procedure of the method of producing a segment body 51 according to another embodiment. The method of producing the segment body 51 according to some embodiments includes a cooling passage forming step S10, a header portion forming step S20, an outlet passage forming step S30, and a header portion etching step S50. The cooling passage forming step S10, the header portion forming step S20, and the outlet passage forming step S30 are the same as the cooling passage forming step S10, the header portion forming step S20, and the outlet passage forming step S30 depicted in FIG. 6. Furthermore, the outlet passage cutting step S40 depicted in FIG. 6 may be carried out subsequent to the header portion etching step S50 according to another embodiment.

In the method of producing the segment body 51 according to some embodiments, the header portion etching step S50 is a step of etching at least a region of the inner wall surface 80a of the header portion 80 such that the roughness of the inner wall surface 80a of the header portion 80 is not greater than the roughness of the inner wall surface 60a of the plurality of first cooling passages 60.

Accordingly, the roughness in at least a partial region of the inner wall surface of the header portion is not greater than the roughness of the inner wall surface of the plurality of first cooling passages, and thus it is possible to suppress pressure loss at the header portion. As described above, contribution to cooling of the high-temperature component is relatively small at the header portion, and thus the influence of the decreased roughness of the header portion on cooling of the high-temperature component is small. Thus, it is possible to suppress impact on cooling of the high-temperature component and suppress pressure loss of the cooling medium.

(Modifying the Laminate Thickness Depending on the Forming Region in the Metal Additive Fabrication)

Generally, when the laminate thickness is increased in metal additive fabrication, the surface roughness of a fabrication object is likely to increase. In other words, when the laminate thickness is decreased in metal additive fabrication, the surface roughness of a fabrication object is likely to decrease.

Thus, in the method of producing the segment body 51 according to some embodiments, in the cooling passage forming step S10, the plurality of first cooling passages 60 may be formed by the metal additive fabrication, by laminating a material powder in the first laminate thickness t1.

In the method of producing the segment body 51 according to some embodiments, in the header portion forming step S20, the header portion 80 may be formed by the metal additive fabrication, by laminating a material powder in the second laminate thickness t2 that is not greater than the first laminate thickness t1.

In the method of producing the segment body 51 according to some embodiments, in the outlet passage forming step S30, the outlet passage 110 may be formed by the metal additive fabrication, by laminating e a material powder in the third laminate thickness t3 small than the first laminate thickness t1.

For instance, the first laminate thickness t1 may be not smaller than 75 μm and not greater than 100 μm. Furthermore, for instance, the third laminate thickness t3 may be not smaller than 20 μm and not greater than 30 μm. For instance, the second laminate thickness t2 may be not smaller than 20 μm and not greater than 100 μm.

Furthermore, in the header portion forming step S20, for instance, a part of the header portion 80 may be formed by lamination in the first laminate thickness t1, and at least a part of the remaining of the header portion 80 may be formed by lamination in the third laminate thickness t3.

With the second laminate thickness t2 for forming the header portion 80 being not greater than the first laminate thickness t1 for forming the first cooling passage 60, it is possible to, for the header portion 80, suppress the roughness and suppress pressure loss of the cooling air CA, and, for the first cooling passages 60, increase the roughness relatively and improve the cooling capacity.

Furthermore, with the third laminate thickness t3 for forming the outlet passage 110 being smaller than the first laminate thickness t1 for forming the first cooling passage 60, it is possible to, for the outlet passage 110, suppress the roughness and suppress variation in pressure loss at the outlet passage 110, and let foreign substances pass through the outlet passage 110 more easily, thereby reducing the risk of clogging of the outlet passage 110. Furthermore, for the first cooling passages 60, as described above, it is possible to increase the roughness relatively and improve the cooling capacity.

(Modifying the Particle Size of the Material Powder Depending on the Forming Region in the Metal Additive Fabrication)

Generally, when the particle size a material powder used in metal additive fabrication is increased, the surface roughness of a fabrication object is likely to increase. In other words, when the particle size of the material powder is decreased in metal additive fabrication, the surface roughness of a fabrication object is likely to decrease.

Thus, in the method of producing the segment body 51 according to some embodiments, in the cooling passage forming step S10, the plurality of first cooling passages 60 may be formed by the metal additive fabrication, by using a material powder which has the first particle size S1.

In the method of producing the segment body 51 according to some embodiments, in the header portion forming step S20, the header portion may be formed by the metal additive fabrication, by using a material powder which has the second particle size S2 not greater than the first particle size S1.

In the method of producing the segment body 51 according to some embodiments, in the outlet passage forming step S30, the outlet passage 110 may be formed, by the metal additive fabrication, by using a material powder which has the third particle size S3 smaller than the first particle size S1.

With the second particle size of the material powder for forming the header portion 80 (second particle size S2) being not greater than the particle size for forming the first cooling passage 60 (first particle size S1), it is possible to, for the header portion, suppress the roughness and suppress pressure loss of the cooling air CA, and, for the first cooling passages 60, increase the roughness relatively and improve the cooling capacity.

Furthermore, with the particle size for forming the outlet passage 110 (third particle size S3) being smaller than the particle size for forming the first cooling passage 60 (first particle size S1), it is possible to, for the outlet passage 110, suppress the roughness and suppress variation in pressure loss at the outlet passage 110, and let foreign substances pass through the outlet passage 110 more easily, thereby reducing the risk of clogging of the outlet passage 110. Furthermore, for the first cooling passages 60, as described above, it is possible to increase the roughness relatively and improve the cooling capacity.

Embodiments of the present invention have been described in detail above, but the present invention is not limited thereto, and various amendments and modifications may be implemented.

For instance, in the above described embodiments, the ring segment 50 is described as an example of a high-temperature component that requires cooling by a cooling medium. Nevertheless, the present invention is not limited to this, and can be applied to other high-temperature components, such as the combustor 12, the rotor blades 41 (e.g., platform 45), the stator vanes 21 (e.g., inner shroud 25 or outer shroud 27), the inner shroud 25, and the outer shroud 27. Furthermore, application of the present invention is not limited to constituent components of the gas turbine 10. The present invention can be applied to constituent components of various machines that use a high-temperature medium, such as a boiler and a rocket engine.

REFERENCE SIGNS LIST

6 Cooling passage group
10 Gas turbine
12 Combustor
13 Turbine
21 Turbine stator vane (stator vane)
41 Turbine rotor blade (rotor blade)
50 Ring segment
51 Segment body
52 Body
52b Outer surface (heating target surface)
60 Axial-direction passage (first cooling passage, cooling passage)
63 Branch flow passage
65 Downstream end
67 Connection part
70 Partition wall
80 Header portion
90 Side-portion passage (second cooling passage)
110 Outlet passage

The invention claimed is:

1. A high-temperature component which requires cooling by a cooling medium, the high-temperature component comprising:
   a plurality of cooling passages through which the cooling medium is able to flow;
   a header portion to which downstream ends of the plurality of first cooling passages are connected; and
   at least one outlet passage for discharging the cooling medium flowing into the header portion to outside of the header portion,
   wherein a roughness of an inner wall surface of the at least one outlet passage is not greater than a roughness of an inner wall surface of the plurality of first cooling passages in a region where a flow-passage cross-sectional area of the outlet passage is the smallest,
   wherein the inner wall surface of the at least one outlet passage has a center-line mean roughness Ra of not greater than 10 μm, in a region where the flow-passage cross-sectional area of the outlet passage is the smallest, and
   wherein the inner wall surface of the plurality of first cooling passages has a center-line mean roughness Ra of not smaller than 10 μm and not greater than 20 μm.

2. The high-temperature component according to claim 1, further comprising a plurality of second cooling passages which extend in a direction which intersects with an extension direction of the plurality of first cooling passages,
   wherein an inner wall surface of the plurality of second cooling passages has a center-line mean roughness of not smaller than 10 μm and not greater than 50 μm.

3. The high-temperature component according to claim 1, wherein a roughness in at least a partial region of an inner wall surface of the header portion is not greater than the roughness of the inner wall surface of the plurality of first cooling passages.

4. The high-temperature component according to claim 1, wherein the high-temperature component is a ring segment of a gas turbine including a plurality of segment bodies in a ring shape arranged along a circumferential direction.

5. A high-temperature component which requires cooling by a cooling medium, the high-temperature component comprising:
   a plurality of cooling passages through which the cooling medium is able to flow;
   a header portion to which downstream ends of the plurality of first cooling passages are connected; and
   at least one outlet passage for discharging the cooling medium flowing into the header portion to outside of the header portion,
   wherein a roughness of an inner wall surface of the at least one outlet passage is not greater than a roughness of an inner wall surface of the plurality of first cooling passages in a region where a flow-passage cross-sectional area of the outlet passage is the smallest, and
   wherein the at least one outlet passage includes a flow-passage cross-sectional area reduction portion where the flow-passage cross-sectional area of the outlet passage gradually decreases toward a downstream side.

6. The high-temperature component according to claim 5, wherein a roughness in at least a partial region of an inner wall surface of the header portion is not greater than the roughness of the inner wall surface of the plurality of first cooling passages.

7. The high-temperature component according to claim 5, wherein the high-temperature component is a ring segment of a gas turbine including a plurality of segment bodies in a ring shape arranged along a circumferential direction.

8. A method of producing a high-temperature component which requires cooling by a cooling medium, the method comprising:
   a step of forming a plurality of cooling passages through which the cooling medium is able to flow;
   a step of forming a header portion to which downstream ends of the plurality of first cooling passages are connected;
   a step of forming at least one outlet passage for discharging the cooling medium flowing into the header portion to outside of the header portion; and
   a step of applying machine processing to at least a part of the inner wall surface of the at least one outlet passage,
   wherein the step of forming the at least one outlet passage includes forming the at least one outlet passage such that a roughness of an inner wall surface of the at least one outlet passage is not greater than a roughness of an inner wall surface of the plurality of first cooling passages in a region where a flow-passage cross-sectional area of the outlet passage is the smallest, and
   wherein the step of forming the at least one outlet passage includes forming the at least one outlet passage by metal additive fabrication or precision casting.

9. The method of producing a high-temperature component according to claim 8,
   wherein the step of forming the at least one outlet passage includes forming the at least one outlet passage so as to include a flow-passage cross-sectional area reduction portion where the flow-passage cross-sectional area of the outlet passage gradually decreases toward a downstream side.

10. The method of producing a high-temperature component according to claim 8,
wherein the step of forming the at least one outlet passage includes forming the at least one outlet passage so that a roughness of an inner wall surface of the at least one outlet passage is not greater than a roughness of an inner wall surface of the plurality of first cooling passages in a region where the flow-passage cross-sectional area of the outlet passage is the smallest, by etching at least a partial section of the outlet passage which includes the region.

11. The method of producing a high-temperature component according to claim 10,
further comprising a step of etching at least a partial region of an inner wall surface of the header portion so that a roughness of the inner wall surface of the header portion is not greater than the roughness of the inner wall surface of the plurality of first cooling passages in the region.

12. The method of producing a high-temperature component according to claim 8,
wherein the step of forming the plurality of first cooling passages includes forming, by metal additive fabrication, the plurality of first cooling passages by laminating a material powder in a first laminate thickness,
wherein the step of forming the header portion includes forming, by metal additive fabrication, the header portion by laminating the material powder in a second laminate thickness which is not greater than the first laminate thickness, and
wherein the step of forming the outlet passage includes forming, by metal additive fabrication, the outlet passage by laminating the material powder in a third laminate thickness smaller than the first laminate thickness.

13. The method of producing a high-temperature component according to claim 8,
wherein the step of forming the plurality of first cooling passages includes forming, by metal additive fabrication, the plurality of first cooling passages by using a material powder having a first particle size,
wherein the step of forming the header portion includes forming, by metal additive fabrication, the header portion by using a material powder having a second particle size not greater than the first particle size, and
wherein the step of forming the outlet passage includes forming, by metal additive fabrication, the outlet passage by using a material powder having a third particle size smaller than the first particle size.

14. The method of producing a high-temperature component according to claim 8,
further comprising a step of forming, by metal additive fabrication, a plurality of second cooling passages extending in a direction which intersects with an extension direction of the plurality of first cooling passages by laminating the material powder in the extension direction of the first cooling passages,
wherein an overhang region, of an inner wall surface of the plurality of second cooling passages, where an overhang angular degree is a predetermined angular degree or more upon lamination of the material powder, has a center-line mean roughness Ra of not smaller than 30 μm and not greater than 50 μm, and
wherein a region, other than the overhang region, of the inner wall surface of the plurality of second cooling passages has a center-line mean roughness Ra of not smaller than 10 μm and not greater than 30 μm.

15. The method of producing a high-temperature component according to claim 8,
wherein the number of the at least one outlet passage is less than the number of the plurality of first cooling passages,
wherein a minimum flow-passage cross-sectional area of each of the at least one outlet passage is not smaller than a flow-passage cross-sectional area of each of the plurality of first cooling passages at a connection part between the header portion and the first cooling passages, and
wherein a sum of respective minimum flow-passage cross-sectional areas of the at least one outlet passage is smaller than a sum of respective flow-passage cross-sectional areas of the plurality of first cooling passages at the connection part between the header portion and the first cooling passages.

* * * * *